[54] ELECTRIC ARC MELTING FURNACE

[75] Inventor: Leonard E. Malin, Pittsburgh, Pa.

[73] Assignee: United States Steel Corporation, Pittsburgh, Pa.

[22] Filed: Nov. 30, 1972

[21] Appl. No.: 311,037

[52] U.S. Cl. ............................ 75/12; 13/9; 75/44 S; 75/60
[51] Int. Cl. ........ C21c 5/52; C21c 5/34; H05b 7/18
[58] Field of Search ................ 75/12, 44 S, 60; 13/9

[56] References Cited
UNITED STATES PATENTS

| | | | |
|---|---|---|---|
| 2,855,293 | 10/1958 | Savard | 75/60 |
| 3,079,247 | 2/1963 | Durrer | 75/12 |
| 3,459,867 | 8/1969 | Estes | 13/9 |
| 3,472,650 | 10/1969 | Sibakin | 75/12 |
| 3,706,549 | 12/1972 | Knuppel | 75/60 |
| 3,708,599 | 2/1973 | Krause | 13/9 |
| 3,812,275 | 5/1974 | Schempp | 13/10 |

*Primary Examiner*—Peter D. Rosenberg
*Attorney, Agent, or Firm*—David S. Urey

[57] ABSTRACT

An apparatus for and a method of melting scrap metal and refining the melted scrap metal is disclosed.

A. The improved apparatus includes an electric arc melting furnace having a shell provided with a mouth; a refractory lining on the shell; a removable roof for sealing the mouth; a melting electrode reciprocable through the roof into and out of contact with scrap metal; and a hearth lining defining with the furnace an upper level of the molten metal. A tuyere extends through the shell and the refractory lining flush with the refractory lining and has an inner pipe and a concentric outer pipe defining an annulus with the inner pipe. Charging means charge the furnace with the scrap metal. Melting means melt a hole in the scrap metal to produce molten metal. Blowing means blow an oxygen bearing gas from the inner pipe through the molten metal to decarburize the molten metal while simultaneously continuing to melt the scrap metal so that when the scrap metal has melted into molten metal the amount of residual carbon in the molten metal is approximately equal to, either more or less than, a predetermined desired amount of carbon, thereby reducing substantially the melting and refining cycle and producing heat exothermically by the chemical combination of the carbon in the molten metal with the oxygen in the oxygen bearing gas to aid in the melting of the scrap metal.

B. The method of melting scrap metal and refining the melted molten metal in the electric-arc melting furnace having a shell provided with a mouth; a refractory lining on the shell; a removable roof for sealing the mouth; a melting electrode reciprocable through the roof into and out of contact with the scrap metal; a hearth line defining with the furnace an upper level of the molten metal; and a tuyere extending through the shell and the refractory lining flush with the refractory lining and having an inner pipe and a concentric outer pipe defining an annulus with the inner pipe, includes the steps of:

a. charging the furnace with the scrap metal;
b. melting a hole in the scrap metal to produce molten metal;
c. blowing an oxygen bearing gas from the inner pipe through the molten metal to decarburize the molten metal while simultaneously continuing to melt the scrap metal so that when the scrap metal has melted into molten metal the amount of residual carbon in the molten metal is approximately equal to, either more or less than, a predetermined desired amount of carbon thereby reducing substantially the melting and refining cycle and producing heat exothermically by the chemical combination of the carbon in the molten metal with the oxygen in the oxygen bearing gas to aid in the melting of the scrap metal; and
d. refining the molten metal to the desired metallurgical composition and pouring temperature.

39 Claims, 9 Drawing Figures

ELECTRIC ARC MELTING FURNACE

BACKGROUND OF THE INVENTION

Heretofore, an electric furnace was filled with scrap metal, and the three electrodes were lowered through electrode holes into the furnace, making contact with scrap metal and boring a single hole or three holes in the scrap metal. The roof was then swung open and hot metal was poured through the roof opening and through the hole or holes in the scrap metal to partially fill the hearth area. The roof was then closed and the electrodes were reinserted into the furance. When the electrodes contacted the molten metal in the hearth area arcing occurred, thereby continuing the melting process of the scrap metal.

Arcing or melting by these arcs must continue until the side port opening is clear of scrap metal. Then and only then can the conventional side lances be inserted through the holes in the furnace and the oxygen directed onto the surface of the hot metal. A period of time is required to melt the scrap from the side walls of the furnace (about one hour) before the side lances can be actuated.

In addition, blowing of oxygen on the hot surface of the hot metal is inefficient and causes foaming of the slag (not shown) on the hot metal.

I am aware of the following prior art:

| U.S. Patent No. | Inventor | Issued | Class |
|---|---|---|---|
| 596,704 | Hartenstein | 1/4/98 | |
| 2,927,142 | LaBate | 3/1/60 | 13/2 |
| 3,157,468 | Kennedy et al | 11/17/64 | 23/151 |
| 3,232,595 | Balster | 2/1/66 | 266/25 |
| 3,395,910 | Holmes | 8/6/68 | 266/41 |
| 3,495,815 | Holmes | 2/17/70 | 266/41 |

OBJECTS OF THE INVENTION

It is the general object of this invention to avoid and overcome the foregoing and other difficulties of and objections to prior art practices by the provision of an improved apparatus for and method of melting scrap metal and refining the melted molten metal, which apparatus and method:

1. reduce the tap to tap time by about one hour thereby increasing production;
2. provide faster scrap melting;
3. commence the refining phase earlier in the melting cycle;
4. minimize foaming of the slag;
5. provide a more efficient utilization of oxygen in the process by directing the oxygen into and through the molten metal bath;
6. provide better utilization of the carbon monoxide generated above the molten metal by directing it to the scrap metal along the furnace walls;
7. create a swirling motion in the molten metal to increase thermal contact with the scrap metal;
8. utilize the tuyere as a preheat for the scrap metal prior to a hot metal addition by combusting the jacket or shroud gases with the oxygen in the oxygen bearing gas;
9. utilize a submerged side tuyere to provide oxygen which reacts with the carbon monoxide evolved from the molten metal to burn the carbon monoxide to carbon dioxide thereby providing additional heat for melting the scrap metal;
10. utilize the tuyere to inject into the molten metal a liquefying agent for lowering the viscosity of the slag on the molten metal;
11. utilize the tuyere to inject into the molten metal a deoxidizing agent to stop the oxidizing process in the molten metal and a fluxing agent to the molten metal to remove sulfur and phosphorus from the molten metal;
12. utilize the tuyere to blow an inert gas through the annulus into a stainless steel molten metal to lower the partial pressure of the carbon monoxide in the molten metal so that the oxygen in the oxygen bearing gas combines with the carbon in the molten steel rather than the chromium in the molten metal to produce a desired stainless steel thereby reducing to a minimum the amount of alloying agent required to cause the chromium to combine with the nickel in the molten metal;
13. utilize the tuyere to superheat the refined steel to the required tapping temperature uniformly throughout the molten bath and raise the molten metal to the same temperature as the higher superheated steel directly under, or adjacent to, the electrode;
14. utilize large pieces of scrap, such as ingots, mould, stools and the like, for the furnace due to the swirling motion of the molten metal bath;
15. eliminate the prior art practice of the removal of skulls along the bottom and side walls of the hearth (by superheating the bath about 50° above the tapping temperature and then charging large pieces of scrap metal to create a boil) by agitating the molten metal bath to keep the hearth zone free of skulls; 16. utilize the tuyere to inject lime into the molten metal bath to remove the sulfur and phosphorus from the molten metal bath by a more efficient lime utilization and utilize a minimum gas flow through the tuyere at a pressure required to overcome the ferro static head of the molten metal bath.

BRIEF SUMMARY OF THE INVENTION

The aforesaid objects of this invention, and other objects which will become apparent as the description proceeds, are achieved by providing an improved apparatus for and method of melting scrap metal and refining the molten melted metal.

A. The improved apparatus includes an electric arc melting furnace having a shell provided with a mouth; a refractory lining on the shell; a removable roof for sealing the mouth; a melting electrode reciprocable through the roof into and out of contact with scrap metal; and a hearth lining defining with the furnace an upper level of the molten metal. A tuyere extends through the shell and the refractory lining flush with the refractory lining and has an inner pipe and a concentric outer pipe defining an annulus with the inner pipe. Charging means charge the furnace with the scrap metal. Melting means melt a hole in the scrap metal to produce molten metal. Blowing means blow an oxygen bearing gas from the inner pipe through the molten metal to decarburize the molten metal while simultaneously continuing to melt the scrap metal so that when the scrap metal has melted into molten metal the amount of residual carbon in the molten metal is approximately equal to, either more or less than, a predetermined desired amount of carbon, thereby reducing substantially the melting and refining cycle and producing heat exothermically by the chemical combination of the carbon in the molten metal with the oxygen in the oxygen bearing gas to aid in the melting of the scrap metal.

B. The method of melting scrap metal and refining the melted molten metal in the electric arc melting furnace having a shell provided with a mouth, a refractory lining on the shell, a removable roof for sealing the mouth, a melting electrode reciprocable through the roof into and out of contact with the scrap metal, a hearth line defining with the furnace an upper level of the molten metal and a tuyere extending through the shell and the refractory lining flush with the refractory lining and having an inner pipe and a concentric outer pipe defining an annulus with the inner pipe, includes the steps of:

a. charging the furnace with the scrap metal;
b. melting a hole in the scrap metal to produce molten metal;
c. blowing an oxygen bearing gas from the inner pipe through the molten metal to decarburize the molten metal while simultaneously continuing to melt the scrap metal so that when the scrap metal has melted into molten metal the amount of residual carbon in the molten metal is approximately equal to, either more or less than, a predetermined desired amount of carbon thereby reducing substantially the melting and refining cycle and producing heat exothermically by the chemical combination of the carbon in the molten metal with the oxygen in the oxygen bearing gas to aid in the melting of the scrap metal; and
d. refining the molten metal to the desired metallurgical composition and pouring temperature.

BRIEF DESCRIPTION OF THE SEVERAL VIEWS OF THE DRAWINGS

For a better understanding of this invention, reference should be had to the accompanying drawings, wherein like numerals of reference indicate similar parts throughout the several views and wherein.

Although the principles of this invention are broadly applicable to converters in general for the melting of scrap metal and the refining of the melted molten metal, this invention is particularly adapted for use in conjunction with an electric arc furnace and hence it has been so illustrated and will be so described.

DETAILED DESCRIPTION

Figure 1:
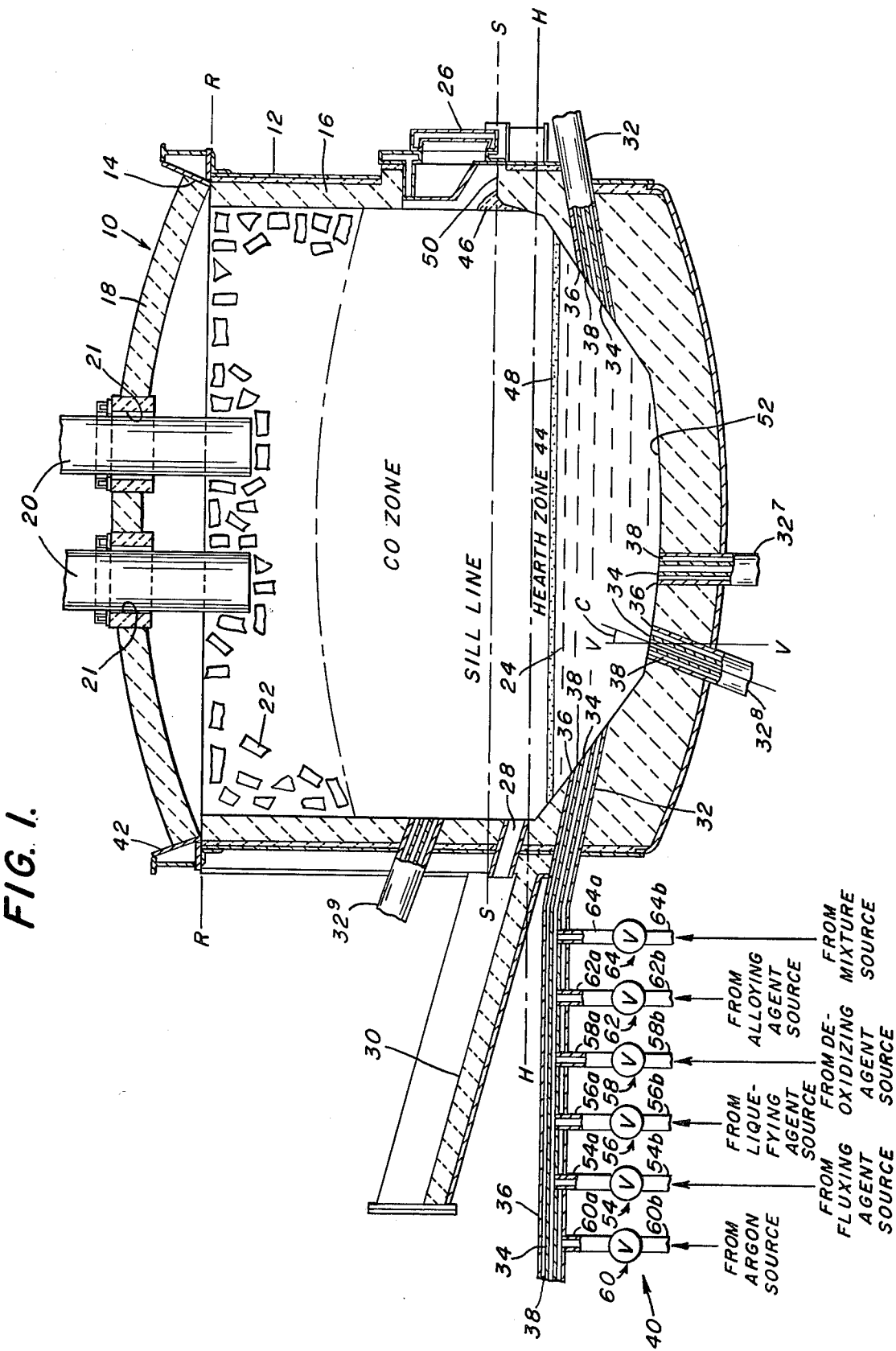
FIG. 1 is a vertical sectional view of an electric arc furnace showing the shell, refractory lining, the roof disposed in sealing engagement with the mouth of the furnace, a pair of submerged side tuyeres disposed in the shell and refractory lining of the furnace, and a side tuyere directed toward the carbon monoxide zone of the furnace.

With specific reference to the form of this invention illustrated in the drawings and referring particularly to FIG. 1, an electric arc melting furnace is indicated generally by the reference numeral 10.

FURNACE 10

This electric arc furnace has a shell 12 (FIGS. 1, 4–6) provided with a mouth 14 (FIG. 1); a refractory lining 16 (FIGS. 1, 4–6) on the shell 12 and a removable refractory lined roof 18 (FIGS. 1,2) for sealing the mouth 14. A plurality of melting electrodes 20 (FIGS. 1,2) are each reciprocable by conventional means (not shown) through holes 21 (FIGS. 1,2) in the roof 18 into and out of contact with scrap metal 22 (FIG. 1). Evacuating means 23 (FIG. 2) are disposed in the roof 18 adjacent the melting electrodes 20 to evacuate the interior of the furnace 10 during the melting of the scrap metal 22 and the refining of the molten metal 24 (FIG. 1).

Figure 4:
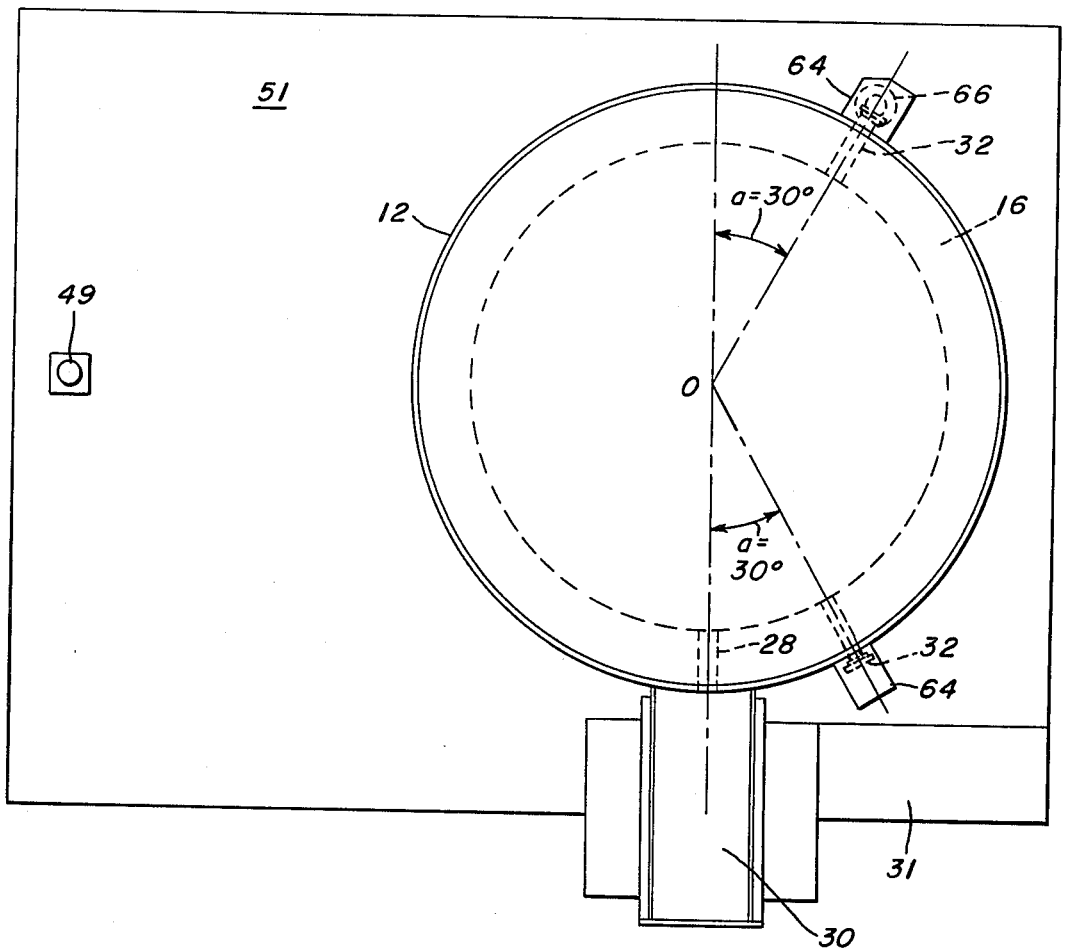
FIG. 4 is a horizontal plan view showing the radial disposition of the submerged tuyeres in the furnace.

As shown in FIG. 1, a hearth line H—H defines with the furnace 10 an upper level of the molten metal 24. In addition to the above described portions, the furnace 10 has a sill line S—S (FIG. 1) disposed above the hearth line H—H (FIGS. 1,5) and defined by a side door 26 (FIG. 1). In addition, the furnace 10 has a tapping hole 28 (FIGS. 1,4) which carries the molten metal 24 from the interior of the furnace 10 to a tapping spout 30 (FIGS. 1,4). In FIG. 4 a walkway 31 on the tilting platform 51 is disposed adjacent the spout 30.

TUYERES 32

Figure 3A:
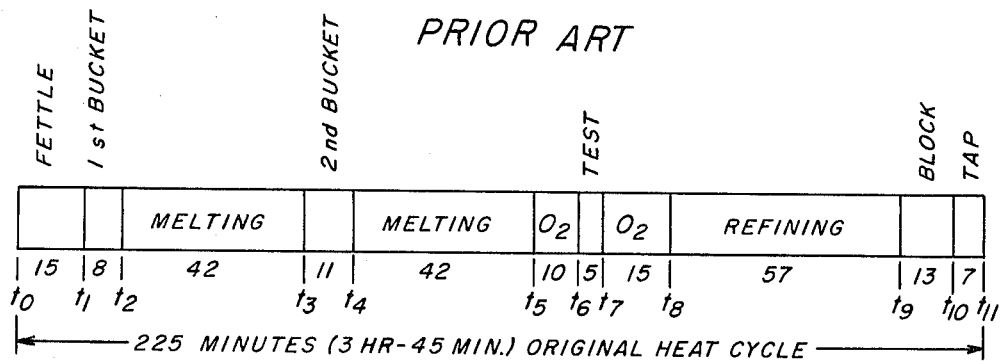
FIG. 3A is a timing diagram showing one complete cycle in the operation of a conventional electric arc melting furnace.
Figure 5:
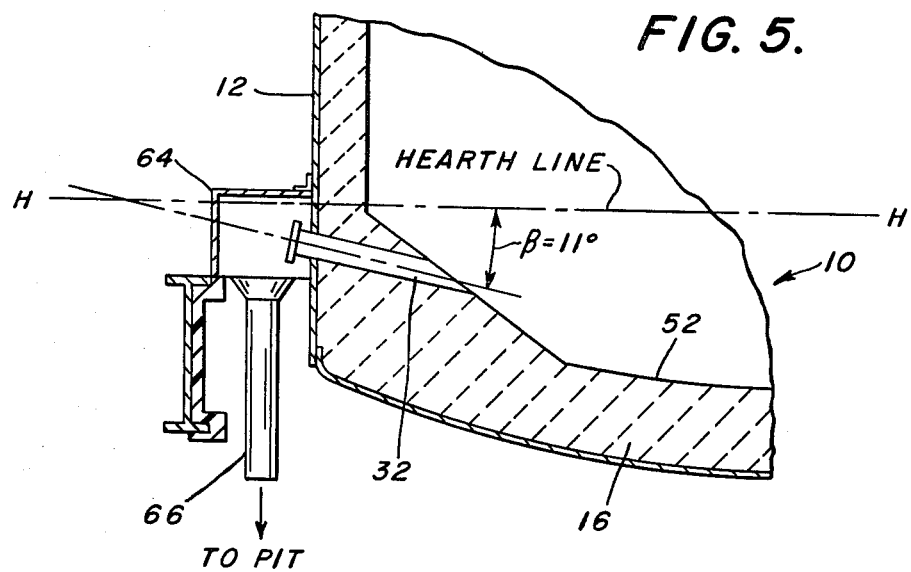
FIG. 5 is a fragmentary vertical sectional view showing the inclined submerged tuyeres inclined with respect to the hearth line of the furnace and showing also a protective hood for collecting molten metal in the event of a burn out of a submerged tuyere and also the means for discharging the molten metal from the protective hood into the bath.

As shown in FIGS. 1,5, the furnace 10 is provided with one or more submerged tuyeres 32 which extend through the shell 12 and the refractory lining 16 flush with the refractory lining 16. Each tuyere 32 has an inner pipe 34 (FIG. 1) and a concentric outer pipe 36 defining an annulus 38 with the inner pipe 34. Blowing means 40 (FIG. 1) are connected to each of the tuyeres 32 for blowing an oxygen bearing gas, such as oxygen, air, or the like, through the inner pipe 34 into the molten metal 24 to decarburize the molten metal 24 while simultaneously continuing to melt the scrap metal 22 so that when the scrap metal 22 has melted into molten metal 24, the amount of residual carbon in the molten metal 24 is approximately equal to, either more or less than, the predetermined desired amount of carbon, thereby reducing substantially the melting and the conventional refining cycle as shown in FIG. 3A and producing heat exothermically by the chemical combination by the carbon in the molten steel 24 with the oxygen in the oxygen bearing gas to aid in the melting of the scrap metal 22.

The melting means or melting electrodes 20 engage the scrap metal 22 and melt a plurality of holes in the scrap metal 22 to produce molten metal 24 for the molten metal bath 24.

Charging means, such as a chute (not shown) or the like, are utilized for charging the furnace 10 with the scrap metal up to a roof part line R—R (FIG. 1).

OPERATION

Figure 2:
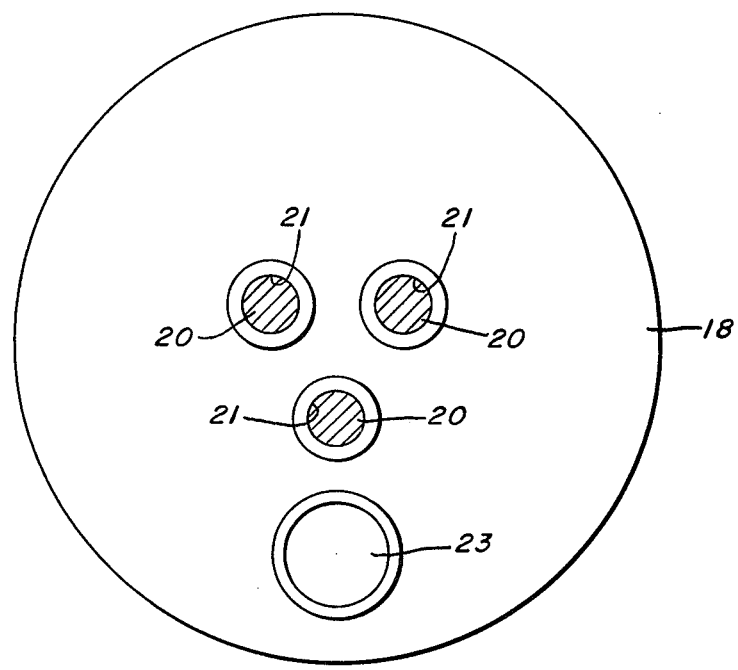
FIG. 2 is a fragmentary plan view showing the arrangement of the electrodes and the evacuating means and the roof of the furnace.
Figure 3B:
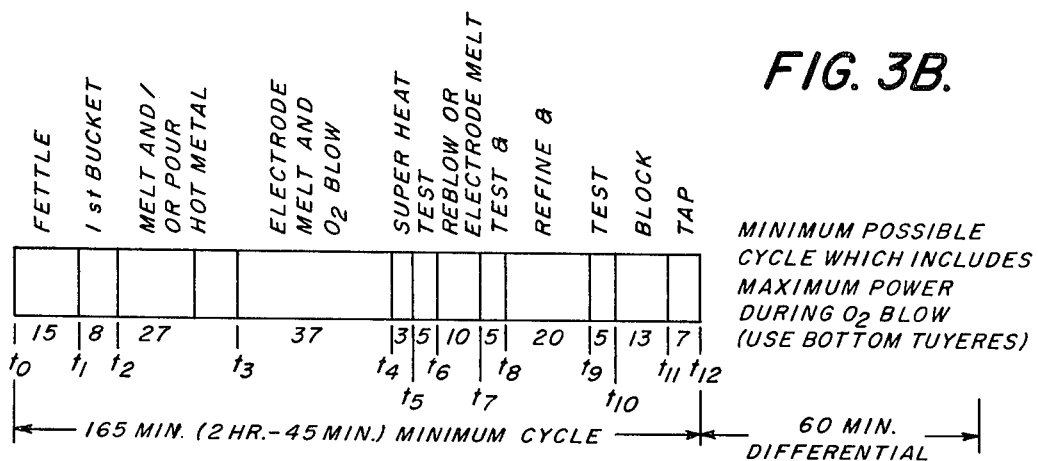
FIG. 3B is a view similar to FIG. 3A showing one complete cycle in the operation of the improved apparatus of the present invention.

Preparatory for the melting and refining operation and referring particularly to FIG. 3B, the electrodes 20 (FIGS. 1, 2) are raised by the conventional means (not shown) through the roof 18 to the upper most raised position (not shown) in the roof 18 out of sealing engagement with the mouth 14 away from the roof ring pins 42 (FIG. 1). The roof 18 is swung horizontally on center pin 49 (FIG. 4) on tilting platform 51 (FIG. 4) away from the mouth 14 of the furnace 10. The charging means (not shown) then fills the interior of the furnace 10 up to the roof line R—R (FIG. 1) with scrap metal 22. A molten metal charging means, such as a ladle (not shown) or the like, then charges hot metal 24 into the scrap metal 22 to provide the hot metal bath 24 at a level up to about one-half the hearth zone 44 (FIG. 1) defined by the hearth line H—H in the bottom of the furnace 10. This addition of the molten metal 24 through the scrap metal 22 melts the contacting portions of the scrap metal 22 to provide additional molten metal from such scrap metal 22 in the hearth zone 44 of the furnace 10.

Thereafter, the roof 18 is swung back (on center pin 49, FIG. 4) into sealing engagement with the mouth 14 against the roof sealing pins 42 (as shown in FIG. 1). The melting electrodes 20 (FIGS. 1,2) are lowered through the electrode holes 21 in the roof 18 into contacts with the scrap metal 22. The electric power is applied to the electrodes 20 so that an arc is generated between the electrodes 20 and the scrap metal 22 thereby causing the electric arc from the descending electrode 20 to melt the scrap metal 22 into the molten metal 24 in the hearth zone 44.

It will be understood by those skilled in the art that the blowing means 40 may be rendered operative prior to the injection of the molten metal 24 into the furnace 10 by causing the shroud gas, such as propane, methane, light fuel oil, or the like, in the annulus 38 to combine with the oxygen in the inner pipe 34 to preheat the scrap metal 22. However, simultaneously with the introduction of the molten metal 24 into the hearth zone 44, the tuyeres 32 become submerged beneath the molten metal 24 and commence to decarburize the molten metal bath 24.

OPERATING CYCLE (FIG. 3B)

Referring now to FIG. 3B, during the fettling period from time $T_0-T_1$ (about 15 minutes), the inside of the furnace 10 is sprayed with a refractory material (not shown) to patch the lining 16. A dam 46 (FIG. 1) is built in front of the door 26 to prevent the slag 48 (FIG. 1) from foaming over the door sill 50, and any additional maintenance such as changing the electrodes 20, dressing the electrodes 20 or repairing the tap hole 28 or the tapping spout 30 is performed.

Thereafter, between the time period $T_1-T_2$ (about 8 minutes) the scrap metal 22 is introduced by the charging means (not shown) into the furnace 10 up to the roof parting line R—R (FIG. 1). During the period $T_2-T_3$ (about 27 minutes), molten metal 24 is produced in the hearth zone 44 by either pouring molten metal from a charging means, such as a ladle or the like, into the scrap metal 22 to burn hole therein or by the use of the melting electrodes 20 to bore arcing holes through the scrap metal 22.

Thereafter, during the time period $T_3-T_4$ (about 37 minutes) the melting electrodes 20 in cooperation with the oxygen from the submerged tuyeres 32 either simultaneously or alone further melt the scrap metal 22 into molten metal 24. During this period $T_3-T_4$, the oxygen from the submerged tuyeres 32 decarburize the molten metal 24 so that the amount of residual carbon in the molten metal 24 is approximately equal to, either more or less than, the predetermined desired amount of carbon. The molten scrap metal 24 melted by the electrodes 20 is then at a higher temperature than the residual molten metal in the hearth zone 44. The combination of the oxygen with the carbon in the molten metal bath 24 produces heat exothermically by the chemical combination of the carbon in the molten metal 24 with the oxygen to aid in the melting of the scrap metal 22. During the time period $T_3-T_4$ or thereafter during the time period $T_4-T_5$ (about 3 minutes) the molten metal bath is superheated by either the melting electrodes 20 or the oxygen from the submerged tuyeres 32 to bring the temperature of the molten metal bath 24 up to the temperature of the melted scrap metal 24 adjacent the electrodes 20.

Thereafter during the time period $T_5-T_6$ (about 5 minutes), the molten metal bath 24 is tested for its desired characteristics by a probe assembly (not shown). Thereafter, during the time period $T_6-T_7$ (about 10 minutes), the molten metal bath 24 is reblown by means of the side tuyeres 32 or heated by the melting electrodes 20 to improve the metallurgical characteristics of the molten metal bath 24. Another test during the period $T_7-T_8$ (about 5 minutes) is made to ascertain the current metallurgical characteristics of the metal bath 24. During the refining period $T_8-T_9$ (about 20 minutes), the final chemistry of the molten metal bath and the tapping temperature of the molten metal bath 24 is obtained.

A final test is made during the period $T_9-T_{10}$ (about 5 minutes) and if the metallurgical characteristics and tapping temperature of the molten bath 24 is satisfactory, blocking of the molten metal bath occurs during the time period $T_{10}-T_{11}$ (about 13 minutes) during which blocking period $T_{10}-T_{11}$ the oxidization process within the molten metal 24 is stopped.

Tapping occurs during the time period $T_{11}-T_{12}$ (about 7 minutes), giving a total overall single cycle operation of about two hours, 45 minutes as distinguished in the conventional cycle of three hours, 45 minutes shown in FIG. 3A.

ALTERNATIVE EMBODIMENTS

It will be understood by those skilled in the art that alternatively the initial molten metal 24 (FIG. 1) produced in the hearth zone 44 of the furnace 10 may be obtained either by use of the electric arc between the electrodes 20 and the scrap metal 22 to melt the scrap metal 22 or by pouring molten metal 24 from a molten metal pouring means, such as a ladle (not shown), into contact with the scrap metal 22 to produce molten metal 24 from the scrap metal 22.

As shown in FIG. 1, the blowing means 40 blows a shroud fluid (such as propane, natural gas or the like or a liquid, such as light fuel oil or the like) through the annulus 38 to cool the inner pipe 34 and preventing of the end of the inner pipe 34 below the surface of the refractory lining 16. As shown in FIG. 4, the tuyeres 32 may be disposed radially (at an angle $a$ = about 30°) through the center 0 of the furnace 10 with respect to the hearth zone 44 of the furnace 10.

As shown in FIG. 5 and in FIG. 1, each tuyere 32 is disposed in the side of the furnace 10 downwardly at an angle B of about 11° or the like with respect to the hearth line H—H to provide the longest possible path for the oxygen to an opposite wall of the refractory lining 16.

Figure 6:
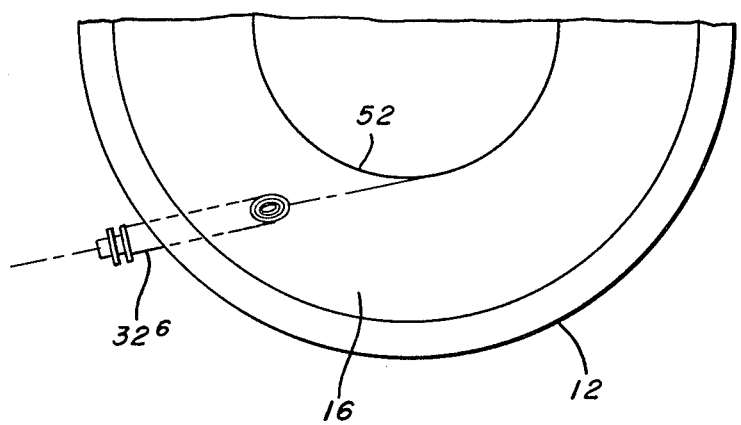
FIG. 6 is a diagrammatic plan view showing a side tuyere disposed in the side wall of the furnace and directed tangentially to the bottom of such furnace.

As shown in FIG. 6, the side tuyere $32^6$ is disposed in the side wall of the furnace 10 and directed tangentially with respect to the furnace bottom 52 (FIGS. 1,5,6) to create a vortex of molten metal 24 which moves in slow intimate heat transfer relation with the scrap metal 22.

As shown in FIG. 1, the vertical submerged tuyere $32^7$ may be disposed in the bottom 52 of the furnace 10. Again as shown in FIG. 1, the inclined submerged tuyere $32^8$ may be disposed in the bottom 52 of the furnace 10 but inclined at an angle C with respect to the vertical axis V—V of the furnace 10.

It will be understood from a consideration of FIGS. 1 and 2 that the evacuating means 23 is operable to suck ambient air into the interior of the furnace 10 through openings in the furnace 10, such as those adjacent the side door 26, so that the carbon monoxide created above the molten metal bath and defined by the carbon monoxide zone (CO zone) in FIG. 1 combines with the indrawn ambient air to form carbon dioxide thereby adding further heat to the melting of the scrap metal 22.

As shown in FIG. 1, a side tuyere $32^9$ is mounted in the side wall of the furnace 10 to direct an oxygen bearing gas into the CO zone above the level of the molten metal 24 so that the carbon monoxide combines with the oxygen to form carbon dioxide thereby providing additional heat for the melting of the scrap metal 22.

As shown in FIG. 1, fluxing means 54 may be connected to the inner pipe 34 to add a fluxing agent (such as burned lime (CaO), limestone ($CaO_3$) or the like) into the metal bath 24 thereby removing sulfur and phosphorus from the metal bath 24. This fluxing means 54 has an inlet pipe 54a containing a valve 54b.

Referring again to FIG. 1, liquefying means 56 (having inlet pipe 56a and valve 56b) are associated with the blowing means 40 for adding a liquefying agent (such as fluorspar ($CaF_2$), aluminum ores or the like) to the molten metal 24 thereby lowering the viscosity of the slag 48 formed on the molten metal 24.

Again as shown in FIG. 1, oxidizing means 58 are associated with the blowing means 40 for adding a deoxidizing agent (such as ferro manganese, ferro silicon or the like) in comminuted form, such as about 0.1 millimeters in diameter, into the molten metal 24 to stop the oxidizing process in said molten metal 24 during the blocking period $T_{10}$–$T_{11}$ (FIG. 3B). Protective gas means 60 (having inlet pipe 60a and valve 60b) may be associated with the blowing means 40 (FIG. 1) for blowing an inert gas (such as argon or the like) through the annulus 38 into a stainless steel molten metal bath 24 to lower the partial pressure of the carbon monoxide in the molten metal 24 so that the oxygen in the oxygen bearing gas emitted from the inner pipe 34 combines with the carbon in the molten metal 24 (rather than the chromium in such molten metal 24), to produce a desired stainless steel and to reduce to a minimum the amount of alloying agent (such as carbon ferro chrome or the like) required to be introduced to the alloying feeding means 62 (FIG. 1) to cause the chromium to combine with the nickel in said stainless steel molten metal 24. The alloying feeding means 62 has an inlet pipe 62a and valve 62b.

A mixture feeding means 64 (having inlet pipe 64a and valve 64b) may be used to feed mixtures of the above described means 54, 56, 58, 60 if desired.

As shown in FIG. 5 in the event that a burn out of a tuyere 32 occurs, a protective chamber 64 is disposed on the shell 12 of the furnace 10 about the inlet of the tuyere 32 for receiving the molten metal 24 from the furnace 10. Discharge means (such as a discharge pipe 66 or the like, FIG. 5) may be connected to the protective chamber 64 for discharging the molten metal 24 from the protective chamber 64 to a disposal means such as a pit (not shown).

Figure 3C:
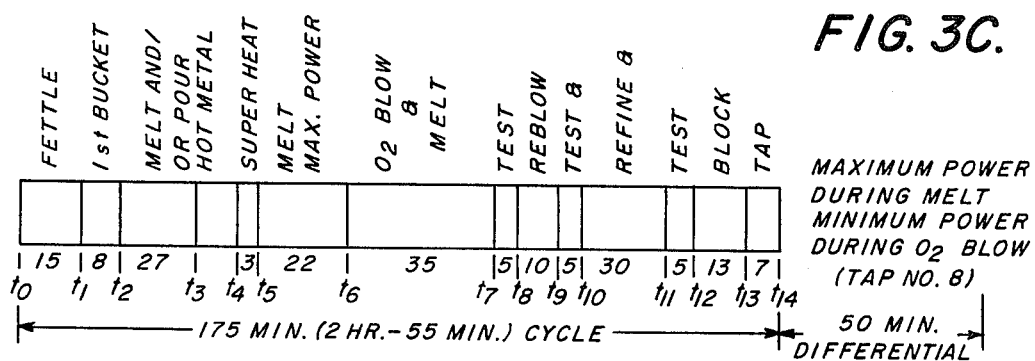
FIGS. 3C and 3D are views similar to FIGS. 3A and 3B showing alternative complete cycles of operation of the improved apparatus of the present invention.
Figure 3D:
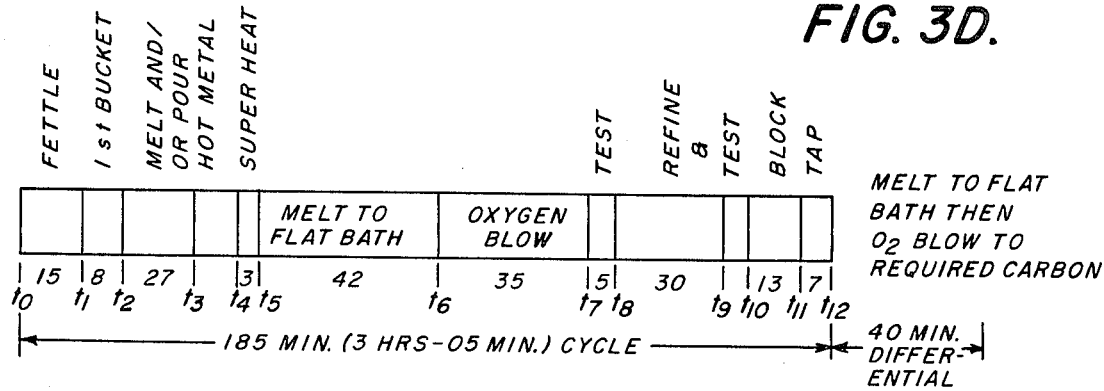

As shown in FIGS. 3C–3D, alternative improved operating cycles of this invention are provided.

METHOD

It will be apparent from the above description of the preferred embodiment of the apparatus and the alternative embodiments mentioned therein that an improved method of melting scrap metal 22 and refining the melted molten metal 24 is disclosed. This method includes the step of:

a. charging the furnace 10 with the scrap metal 22;

b. melting a hole in the scrap metal 22 to produce molten metal 24;

c. blowing an oxygen bearing gas from the inner pipe 34 of the tuyere 32 through the molten metal 24 to decarburize the molten metal 24 while simultaneously continuing to melt the scrap metal 22 so that when the scrap metal 22 has melted into molten metal 24 the amount of residual carbon in the molten metal 24 is approximately equal to, either more or less than a predetermined desired amount of carbon, thereby reducing substantially the melting and refining cycle time (FIGS. 3A,3B) and producing heat exothermically by the chemical combination of the carbon in the molten metal 24 with the oxygen in the oxygen bearing gas to aid in the melting of the scrap metal 24; and d. refining the molten metal 24 to the desired metallurgical composition and pouring temperature.

In addition, the improved method contemplates the following additional steps:

a. charging the furnace 10 with scrap metal 22 up to a roof parting line R—R of the furnace 10;

b. melting a hole in the scrap metal 22 to produce molten metal 24 by the addition of hot metal 24 to the furnace 10 in contact with the scrap metal 22;

c. melting a hole in the scrap metal 22 to produce molten metal 24 by the melting electrodes 20;

d. blowing a shroud fluid (such as propane, natural gas, light fuel oil, or the like) through the annulus 38 while blowing the oxygen bearing gas through the inner pipe 34 to cool the inner pipe 34 and to prevent burning of the end of the inner pipe 34 below the surface of the refractory lining 16;

e. blowing (from the submerged side tuyere 32, FIG. 4) the oxygen bearing gas from the side of the furnace 10 through the molten metal 24 radially (FIG. 4) with respect to the hearth zone 44 of the furnace 10 defined by the hearth line H—H and the bottom 52 of the furnace 10;

f. blowing (from the submerged side tuyere 32, FIG. 5) the oxygen bearing gas through the molten metal from the side of the furnace 10 downwardly at an angle B with respect to the hearth line H—H to provide the longest path of said oxygen bearing gas to an opposite wall of the refractory lining 16;

g. blowing (from the side tuyere $32^6$, FIG. 6) the oxygen bearing gas from the side of the furnace 10 through the molten metal 24 tangentially (FIG. 6) with respect to the furnace bottom 52 (FIG. 6) to create a vortex of molten metal 24 in more intimate heat transfer relationship with the scrap metal 22;

h. blowing (from the submerged bottom tuyeres $32^7$, FIG. 1 and $32^8$, FIG. 1) the oxygen bearing gas through the molten metal 24 from the bottom 52 of the furnace 10;

i. blowing (from the submerged inclined bottom tuyere $32^8$, FIG. 1) the oxygen bearing gas from the bottom 52 of the furnace 10 through the molten metal 24 but inclined at an angle C with respect to the vertical axis V—V of the furnace 10;

j. combining the air sucked into the furnace 10 from openings (such as the side door 26 or the like) with the carbon monoxide produced in the carbon monoxide zone (CO zone) above the molten metal 24 to form carbon dioxide, thereby adding further heat to the melting of the scrap metal 22;

k. adding (by fluxing means 54, FIG. 1) a fluxing agent (such as burned lime CaO), limestone ($CaCO_3$) or the like) through the inner pipe 34 into the molten metal 24 thereby removing sulfur and phosphorus from the molten metal 24;

l. adding (by liquefying means 56, FIG. 1) a liquefying agent (such as fluorspar ($CaF_2$) aluminum ores or the like) through the inner pipe 34 to the molten metal 24 thereby lowering the viscosity of the slag 48 formed in the molten metal 24;

m. adding (by deoxidizing means 58, FIG. 1) a deoxidizing agent (such as ferromanganese, ferro silicon, or the like) through the inner pipe 34 to the molten metal 24 thereby stopping the oxidizing process in the molten metal 24 during the blocking period $T_{10}$–$T_{11}$, FIG. 3B;

n. blowing (by protective gas means 60, FIG. 1) an inert gas (such as argon or the like) through the annulus 38 into a stainless steel molten metal bath 24 to lower the partial pressure of the carbon monoxide in the molten metal 24 so that the oxygen in the oxygen bearing gas combines with the carbon in the molten metal 24 rather than with the chromium in the molten metal 24 to produce a desired stainless steel thereby reducing to a minimum the amount of alloying agent (such as carbon ferro chrome or the like) required to be added (by alloying agent means 62, FIG. 1) to cause the chromium to combine with the nickel in the stainless steel molten metal 24;

o. in the event of a burn out of the tuyere 32, confining the molten metal in a protective chamber 64 adjacent the tuyere 32 and mounted on the shell 12;

p. discharging (by pipe 66, FIG. 5) the molten metal 24 from the protective chamber 64; and q. directing (from side tuyere $32^9$, FIG. 1) an oxygen bearing stream from the side wall of the furnace 10 so that the oxygen from said stream combines with the carbon monoxide in a carbon monoxide zone (CO zone) above the molten metal 24 to form carbon dioxide and produce added heat for the melting of the scrap metal 22.

SUMMARY OF THE ACHIEVEMENTS OF THE OBJECTS OF THE INVENTION

It will be understood by those skilled in the art that the above described improved apparatus for and method of melting scrap metal 22 and for refining the melted molten scrap metal 24:

1. reduce the tap to tap time by about one hour thereby increasing production (FIGS. 3A, 3B);

2. provide faster scrap melting;

3. commence the refining phase earlier in the melting cycle (FIG. 3B), than in the conventional cycle (FIG. 3A);

4. eliminate foaming of the slag 48;

5. provide a more efficient utilization of oxygen in the process by directing the oxygen into the molten metal bath 24;

6. provide better utilization of the carbon monoxide generated above the molten metal 24 by directing it to the scrap metal 22 along the furnace walls;

7. create a swirling motion in the molten metal 24 to increase thermal contact with the scrap metal 22;

8. utilize the tuyere $23^9$ (FIG. 1) as a preheat for the scrap metal 22 prior to a hot metal addition by combusting the jacket or shroud gases with the oxygen in the oxygen bearing gas;

9. utilize a non-submerged side tuyere $32^9$ (FIG. 1) to provide oxygen which reacts with the carbon monoxide evolved from molten metal 24 to burn the carbon monoxide to carbon dioxide thereby providing additional heat with a melt to scrap metal 22;

10. utilize the tuyere $32,32^7,32^8$ (FIG. 1) to inject into the molten metal 24 a liquefying agent for lowering the viscosity of the slag 48 on the molten metal 24;

11. utilize the tuyere $32,32^7,32^8$ (FIG. 1) as a deoxidizing agent to the molten metal 24 to stop the oxygen process in the molten metal 24 and a fluxing agent to the molten metal 24 to remove sulfur and phosphorus from the molten metal 24;

12. utilize the tuyere $32,32^7,32^8$ (FIG. 1) to blow an inert gas through the annulus 38 into a stainless steel molten metal 24 to lower the partial pressure of the carbon monoxide in the molten metal 24 so that the oxygen in the oxygen bearing gas combines with the carbon in the molten steel 24 rather than the chromium in the molten metal 24 to produce a desired stainless steel thereby reducing to a minimum the amount of alloying agent required to cause the chromium to combine with the nickel in the molten metal 24;

13. utilizing the tuyere $32,32^7$, $32^8$, $32^9$ (FIG. 1) to superheat the refined steel 24 to the required tapping temperature uniformly throughout the molten bath 24 and raise the molten metal 24 to the same temperature as the higher superheated steel 24 directly under or adjacent to the electrodes 20;

14. utilize large pieces of scrap 22 (such as ingots, moulds, stools and the like) as scrap metal 22 for the furnace 10 due to the swirling motion of the molten metal bath 24;

15. eliminate the prior art practice of removal of skulls (not shown) along the bottom and side walls of the hearth zone 44 (by superheating the bath about 50° above the tapping temperature and then charging large pieces of scrap metal 22 to create a boil) by agitating the molten metal bath 24 to keep the hearth zone 44 free of skulls (not shown);

16. utilize the tuyere (32,32⁷,32⁸, FIG. 1) to inject lime into the molten metal bath 24 to remove the sulfur and phosphorus from the molten metal bath 24 by a more efficient lime utilization and utilize a minimum gas flow through the tuyere (32,32⁷, 32⁸, FIG. 1) at a pressure required to overcome the ferro static head of the molten metal bath 24.

While in accordance with the patent statutes, preferred and alternative embodiments of this invention have been illustrated and described in detail, it is to be particularly understood that the invention is not limited thereto or thereby.

I claim:

1. A method of melting scrap metal and refining the melted molten metal in an electric arc furnace having a shell provided with a mouth, a refractory lining on said shell, a removable roof for sealing said mouth, a melting electrode reciprocable through said roof into and out of contact with said scrap metal, a hearth line defining with said furnace an upper level of said molten metal and a tuyere extending through said shell and said refractory lining flush with said refractory lining and having an inner pipe and a concentric outer pipe defining an annulus with said inner pipe, said method including the steps of:
   a. charging said furnace with said scrap metal;
   b. melting a hole in said scrap metal to produce molten metal;
   c. energizing said electrode to heat said scrap metal with heat from said electrode;
   d. blowing an oxygen bearing gas from said inner pipe through said molten metal to decarburize said molten metal while simultaneously continuing to melt said scrap metal so that when said scrap metal has melted into molten metal the amount of residual carbon in said molten metal is less than a predetermined desired amount of carbon, thereby reducing substantially the melting and refining cycle and producing heat exothermically by the chemical combination of the carbon in the molten metal with the oxygen in the oxygen bearing gas to aid in the melting of said scrap metal; and
   e. refining said molten metal to the desired metallurgical composition and pouring temperature.

2. The method recited in claim 1 including the step of:
   a. charging said furnace with said scrap metal up to a roof parting line of said furnace.

3. The method recited in claim 1 including the step of:
   a. melting a hole in said scrap metal by the addition of hot metal to said furnace to melt a portion of said scrap.

4. The method recited in claim 1 including the step of melting a hole in said scrap metal with said melting electrode to produce molten metal.

5. The method recited in claim 1 including the step of:
   a. blowing a shroud gas through said annulus while blowing said oxygen bearing gas through said inner pipe to cool said inner pipe and prevent burning of the end of said inner pipe below the inner surface of said refractory lining.

6. The method recited in claim 1 including the step of:
   a. blowing said oxygen bearing gas from the side of said furnace through said molten metal radially with respect to a hearth zone of said furnace defined by said hearth line and the bottom of said refractory lining.

7. The method recited in claim 1 including the step of:
   a. blowing said oxygen bearing gas through said molten metal from the side of the furnace downwardly at an angle with respect to said hearth line to provide the longest path of said oxygen bearing gas to an opposite wall of said refractory lining.

8. The method recited in claim 1 including the steps of:
   a. blowing said oxygen bearing gas from the side of said furnace through said molten metal tangentially with respect to a furnace bottom of said furnace to create a vortex of molten metal in more intimate heat transfer relation with said scrap metal.

9. The method recited in claim 1 including the step of:
   a. blowing said oxygen bearing gas through said molten metal from the bottom of said furnace.

10. The method recited in claim 1 including the step of:
    a. blowing said oxygen bearing gas from the bottom of said furnace through said molten metal at an angle inclined to the vertical axis of said furnace.

11. The method recited in claim 1 including the step of:
    a. evacuating said furnace during said melting, decarburization and refining.

12. The method recited in claim 11 including the step of:
    a. combining the air sucked into the furnace from openings therein with the carbon monoxide produced above the molten metal to form carbon dioxide thereby adding further heat to the melting of the scrap metal.

13. The method recited in claim 1 including the step of:
    a. adding a fluxing agent through said inner pipe to said molten metal thereby removing sulfur and phosphorus from said molten metal.

14. The method recited in claim 1 including the step of:
    a. adding a liquefying agent through said inner pipe to said molten metal thereby lowering the viscosity of a slag formed on said molten metal.

15. The method recited in claim 1 including the step of:
    a. adding a deoxidizing agent through said inner pipe to said molten metal thereby stopping the oxidizing process in said molten metal.

16. The method recited in claim 1 including the step of:
    a. blowing an inert gas through said annulus into a stainless steel molten metal to lower the partial pressure of carbon monoxide in said molten metal so that the oxygen in said oxygen bearing gas combines with the carbon in said molten metal rather than with the chromium in said molten metal to produce a desired stainless steel thereby reducing to a minimum the amount of alloying agent required to cause the chromium to combine with the nickel in said stainless steel molten metal.

17. The method recited in claim 1 including the step of:
a. confining said molten metal in a protective chamber adjacent said tuyere and on said shell in the event of a burn out of said tuyere.

18. The method recited in claim 17 including the step of:
a. discharging said molten metal from said protective chamber.

19. The method recited in claim 1 including the step of:
a. superheating the molten metal so that the temperature of said molten metal approaches the temperature of said melted scrap metal.

20. An electric arc furnace having:
a. a shell provided with a mouth;
b. a refractory lining on said shell;
c. a removable roof for sealing said mouth;
d. a hearth line defining with said furnace an upper level of said molten metal;
e. a tuyere extending through said shell and said refractory lining terminating flush with said refractory lining and having an inner pipe and a concentric outer pipe defining an annulus with said inner pipe;
f. means for charging said furnace with said scrap metal;
g. means for melting a hole in said scrap metal to produce molten metal; and
h. means for blowing an oxygen bearing gas from said inner pipe through said molten metal to decarburize said molten metal while simultaneously continuing to melt said scrap metal so that when said scrap metal has melted into molten metal the amount of residual carbon in said molten metal is approximately equal to, either more or less than, a predetermined desired amount of carbon, thereby reducing substantially the melting and refining cycle and producing heat exothermically by the chemical combination of the carbon in the molten metal with the oxygen in the oxygen bearing gas to aid in the melting of said scrap metal.

21. The electric arc furnace recited in claim 20 wherein:
a. said charging means charges said furnace with said scrap metal up to a roof parting line of said furnace.

22. The electric arc furnace recited in claim 20 wherein:
a. said melting means includes an electrode which contacts said scrap metal and melts said scrap metal to produce molten metal in said furnace.

23. The electric arc furnace recited in claim 20 wherein:
a. said melting means includes means for pouring molten metal into contact with said scrap metal to produce molten metal from said scrap metal in said furnace.

24. The electric arc furnace recited in claim 20 wherein:
a. said blowing means blows a shroud gas through said annulus to cool said inner pipe and prevent burning of the end of said inner pipe below the inner surface of said refractory lining.

25. The electric arc furnace recited in claim 20 wherein:

a. said tuyere is disposed radially in said furnace with respect to a hearth zone of said furnace defined by said hearth lining and the bottom of said refractory lining.

26. The electric arc furnace recited in claim 20 wherein:
a. said tuyere is disposed in the side of said furnace downwardly at an angle with respect to said hearth line to provide the longest path of said oxygen bearing gas to an opposite wall of said refractory lining.

27. The electric arc furnace recited in claim 20 wherein:
a. said tuyere is disposed in the side of said furnace and directed tangentially with respect to a furnace bottom of said furnace to create a vortex of molten metal in more intimate heat transfer relationship with said scrap metal.

28. The electric arc furnace recited in claim 20 wherein:
a. said tuyere is disposed in the bottom of said furnace.

29. The electric arc furnace recited in claim 20 wherein:
a. said tuyere is disposed in the bottom of said furnace and is inclined at an angle to the vertical axis of said furnace.

30. The electric arc furnace recited in claim 20 and having:
a. evacuating means associated with said furnace for evacuating the interior of said furnace during melting, decarburizing and refining.

31. The electric arc furnace recited in claim 30 wherein:
a. said evacuating means sucks into the furnace ambient air through openings therein to cause said ambient air to combine with the carbon monoxide produced above said molten metal to form carbon dioxide thereby adding further heat to the melting of the scrap metal.

32. The electric arc furnace recited in claim 20 and having:
a. fluxing means associated with said blowing means for adding a fluxing agent through said inner pipe to said molten metal thereby removing sulfur and phosphorus from said molten metal.

33. The electric arc furnace recited in claim 20 and having:
a. liquefying means associated with said blowing means for adding a liquefying agent through said inner pipe to said molten metal thereby lowering the viscosity of a slag formed on said molten metal.

34. The electric arc furnace recited in claim 20 and having:
a. deoxidizing means associated with said blowing means for adding a deoxidizing agent through said inner pipe to said molten metal thereby stopping the oxidizing in said molten metal.

35. The electric arc furnace recited in claim 20 wherein:
a. said blowing means blows an inert gas through said annulus into a stainless steel molten metal to lower the partial pressure of the carbon monoxide in said molten metal so that the oxygen in said oxygen bearing gas combines with the carbon in said molten metal, rather than the chromium in said molten metal, to produce a desired stainless steel thereby reducing to a minimum the amount of alloying agent required to cause the chromium to combine with the nickel in said stainless steel molten metal.

36. The electric arc furnace recited in claim 20 and having:
 a. a protective chamber disposed about the inlet of said tuyere and on said shell for receiving said molten metal from said furnace when a burn out of said tuyere occurs.

37. The electric arc furnace recited in claim 36 and having:
 a. discharge means for discharging said molten metal from said protective chamber to a disposal means.

38. The electric arc furnace recited in claim 20 wherein:
 a. said blowing means and said melting means superheats said molten metal so that the temperature of said molten metal approaches the temperature of said melted scrap metal.

39. An improved method of melting steel scrap and refining steel in an electric arc furnace having at least one electrode, comprising the steps of:
 charging the furnace with steel scrap;
 heating said scrap with said electrode to melt said scrap and provide a level of molten metal in said furnace;
 blowing an oxygen bearing gas through a first tuyere submerged beneath the level of the liquid metal into the liquid metal to chemically react with the carbon and other constituents of the metal thereby oxidizing the carbon and other constituents and generating heat simultaneously with the heating by said electrode of said scrap;
 blowing a shroud gas through an annulus around said first tuyere formed by a second concentric outer tuyere to cool said first tuyere and minimize its wear; and
 refining said molten metal to the desired metallurgical composition and pouring temperature.

* * * * *

UNITED STATES PATENT OFFICE
CERTIFICATE OF CORRECTION

Patent No. 3,902,889         Dated September 2, 1975

Inventor(s) Leonard E. Malin

It is certified that error appears in the above-identified patent and that said Letters Patent are hereby corrected as shown below:

Column 5, line 34, "contacts" should read -- contact --.

Claim 1, line 38, after "is" insert -- approximately equal to, either more or --.

Signed and Sealed this

Twenty-second Day of February 1977

[SEAL]

Attest:

RUTH C. MASON
*Attesting Officer*

C. MARSHALL DANN
*Commissioner of Patents and Trademarks*

Disclaimer 3,902,889.—*Leonard E. Malin*, Pittsburgh, Pa. ELECTRIC ARC MELTING FURNACE. Patent dated Sept. 2, 1975. Disclaimer filed Sept. 18, 1978, by the assignee, *United States Steel Corp.*

Hereby enters this disclaimer to claims 21, 22, 24, 28, 29, 31, 32, 33, 34, 35 and 38 of said patent.

[*Official Gazette September 27, 1983.*]